US005466996A

United States Patent [19]

Gai et al.

[11] Patent Number: 5,466,996

[45] Date of Patent: Nov. 14, 1995

[54] ELECTROMECHANICAL REMOTE-CONTROL DEVICE

[75] Inventors: Giorgio Gai; Walter Trivella, both of Genoa, Italy

[73] Assignee: Ultraflex S.r.L., Genoa, Italy

[21] Appl. No.: 233,958

[22] Filed: Apr. 28, 1994

[30] Foreign Application Priority Data

Dec. 16, 1993 [IT] Italy ................................ GE93A0108

[51] Int. Cl.$^{6}$ ........................................ H02P 7/00

[52] U.S. Cl. ................................ 318/16; 74/365; 74/361; 74/500.5

[58] Field of Search ................................ 74/500.5, 501.6, 74/361, 502.4, 502.5, 365; 318/16; 364/465

[56] References Cited

U.S. PATENT DOCUMENTS

| | | | |
|---|---|---|---|
| 3,330,477 | 7/1967 | Stephens . | |
| 3,612,486 | 10/1971 | Martin et al. | 74/361 |
| 3,774,570 | 11/1973 | Pearson | 74/500.5 |
| 4,554,824 | 11/1985 | King et al. | 74/365 |
| 4,601,640 | 7/1986 | Sommer | 74/361 |
| 5,131,441 | 7/1992 | Simpson et al. | 364/465 |
| 5,351,692 | 10/1994 | Dow et al. | 318/16 |

FOREIGN PATENT DOCUMENTS

| | | |
|---|---|---|
| 2310917 | 12/1976 | France . |
| 1099884 | 2/1961 | Germany . |
| 3200241 | 8/1983 | Germany . |
| 1558115 | 12/1979 | United Kingdom . |

*Primary Examiner*—William M. Shoop, Jr.
*Assistant Examiner*—Karen Masih
*Attorney, Agent, or Firm*—Birch, Stewart, Kolasch & Birch

[57] ABSTRACT

The remote-control device features a servomechanism that transmits the movements of a first control cable or tie rod, which is connected to handgrip or control pedal, to a second cable or tie rod which is connected to an application. The servomechanism features two neutral levers with bodies having a cylindrical sector. The levers are connected, respectively, to the cables or tie rods. This servomechanism features a shaft of a geared motor which is arranged coaxially between two bodies of the levers, features a spiral spring arranged between the two bodies and the shaft, and is tightly wound on the shaft. The spring has opposing ends which face outward and extend between the bodies. The servomechanism further features a transducer which detects the movements of first control cable and actuates an electronic unit which controls the geared motor in such a way that the remote control can be effected electromechanically or, in the event that the electrical components malfunction, mechanically.

9 Claims, 4 Drawing Sheets

ELECTROMECHANICAL REMOTE-CONTROL DEVICE

BACKGROUND OF THE INVENTION

1. Field of the Invention

This invention deals with an electromechanical remote-control device that is to be used, in particular, for controlling the engines and steering systems, but can also be used on other means of transportation such as, for example, ground-transportation vehicles and, in general, in any kind of equipment in which means of guidance and operation are remotely controlled.

2. Description of Related Art

Different types of remote-control devices are presently known which basically consist of the following:

a mechanical system;

an electrical system; and a hydrodynamic system.

The basic problems for such remote-control devices are to guarantee long-term operation, precise transmission of the movements of the handgrip or control pedal to the application, and minimization of effort on the part of the operator.

The known truly mechanical system generally consists of rigid tie rods or flexible sheathed cables that connect the control to the application. This kind of system, while highly reliable, may be difficult or tiring to manipulate, especially when there are significant distances between the control and the application and when there are multiple controls arranged in series. In the case of flexible cables, deformations then occur in the cable which impede the transmission of control and increase the amount of effort required for control.

Systems that operate on electricity or hydrodynamics are more accurate in implementing control and require relatively little effort on the part of the user but, because of their complexity, are more prone to malfunctions and thus suffer from the serious disadvantage that, if the power supply is damaged or not working, control becomes impossible. This would be extremely dangerous in the case of ships and boats in general, which would then become uncontrollable.

SUMMARY OF THE INVENTION

The purpose of the present invention is to eliminate the above-mentioned drawbacks in known remote-control arrangements and to make it possible to effect precise control with limited effort and with the guarantee that said control will always be operational.

According to the invention, the remote-control device is of the electromechanical type and consists of a servomechanism that is connected to both the control and the application by means of flexible connectors, such as sheathed cables, or rigid connectors such as tie rods, or mixed connectors.

The servomechanism basically features two neutral levers, generally facing one another, which are connected to, respectively, the control cable and the driven cable that is connected to the application. The levers feature a body with a semicylindrical sector that covers an arc of a circle that is slightly smaller than 180° and the bodies are mounted facing one another and surrounding a spring that is tightly wound on a drive shaft of a geared motor.

The spring has ends arranged at 180° and curves outward in such a way that the ends are arranged between the edges of the two bodies of the levers.

When the control cable is manipulated, the lever that is connected to it turns on the spring and, by pressing on the spring's corresponding end in the direction opposite that in which it is wound, causes the coils to widen, resulting in the release of the frictional clamping of the spring to the shaft of the geared motor.

The effect of this is that manipulating this control cable also turns the spring which, in turn, causes the other lever to turn in the same direction as the control lever. Once the control cable ceases to move, the spring, which is no longer being pushed at its ends in the direction opposite that in which it is wound, is again wound tightly on the shaft of the geared motor and blocks movement in a non-return position.

This control is effected when the control cable is both pulled and pushed, resulting in pulling and pushing on the driven cable and the corresponding manipulation of the application.

The equipment described here is purely mechanically operated and, according to the invention, it comprises a kind of control that operates electromechanically.

This electromechanical control includes an electronic control unit that is actuated by a transducer and is able to manipulate the geared motor and to cause the corresponding shaft to turn. In a detailed version of a preferred embodiment, the electromechanical control comprises a cursor that is attached to the end of the conduit of the control cable located next to the device, where the cursor effects small movements that correspond to movements of the sheath that are reactive and are opposite to the movements of the cable inside the sheath itself. In other words, when the cable moves, e.g., toward one side, the sheath reacts by moving slightly in the opposite direction, thus causing the cursor to move.

A transducer that is attached to the cursor detects these small movements of the cursor and the sheath and activates a control unit that controls the geared motor; as mentioned above, the drive shaft of the geared motor is arranged between the bodies of the levers and inside the above-mentioned spring that is tightly wound on the shaft.

It follows from this that, when the control cable is manipulated, the cursor actuates the transducer, and the geared motor is driven via the control unit, thus causing the drive shaft to rotate in one direction or the opposite direction. The drive shaft entrains the spring by friction; in turn, the spring, with the corresponding end facing outward, causes the driven lever to turn and acts on the driven cable, which implements the control of the application.

It should be noted that, when the control cable is manipulated, it causes the control lever to turn as well, but this has no effect on the spring since, before the lever acts on the end of the spring, the geared motor is actuated by the control unit, and consequently the rotation of the driven lever is accomplished by means of the geared motor and not via the drive lever.

This is explained by the fact that the bodies of the levers wind the spring and the shaft of the geared motor with arcs of a circle of less than 180° for which the control lever can effect a small rotation by an angle $\alpha$ without significantly acting on the spring and the actuation of the geared motor takes place in the range of the rotation $\alpha$.

When the geared motor has caused the driven lever to rotate and the control force on the control cable has ceased, the transducer returns to its base state, and the geared motor stops with the application in the new desired position.

This position is maintained without any force being exerted on the handgrip of the control cable since the outward-facing ends of the spring that is tightly wound on the drive shaft keep the levers from turning. In essence, this spring performs a non-return function similar to that described in Italian patent No. 1238752.

It follows from this that, according to the goals of this invention, remote control can be effected by means of the above-described electromechanical device with precision and with no effort. In cases where, due to damage to the electrical hardware or a lack of power, control cannot be implemented via the electromechanical device, it is always possible to exercise control mechanically, thus guaranteeing that control will always work and be transmitted.

BRIEF DESCRIPTION OF THE DRAWINGS

The present invention is explained using one embodiment of it in the attached drawings, wherein.

DETAILED DESCRIPTION OF PREFERRED EMBODIMENTS

Figure 5:
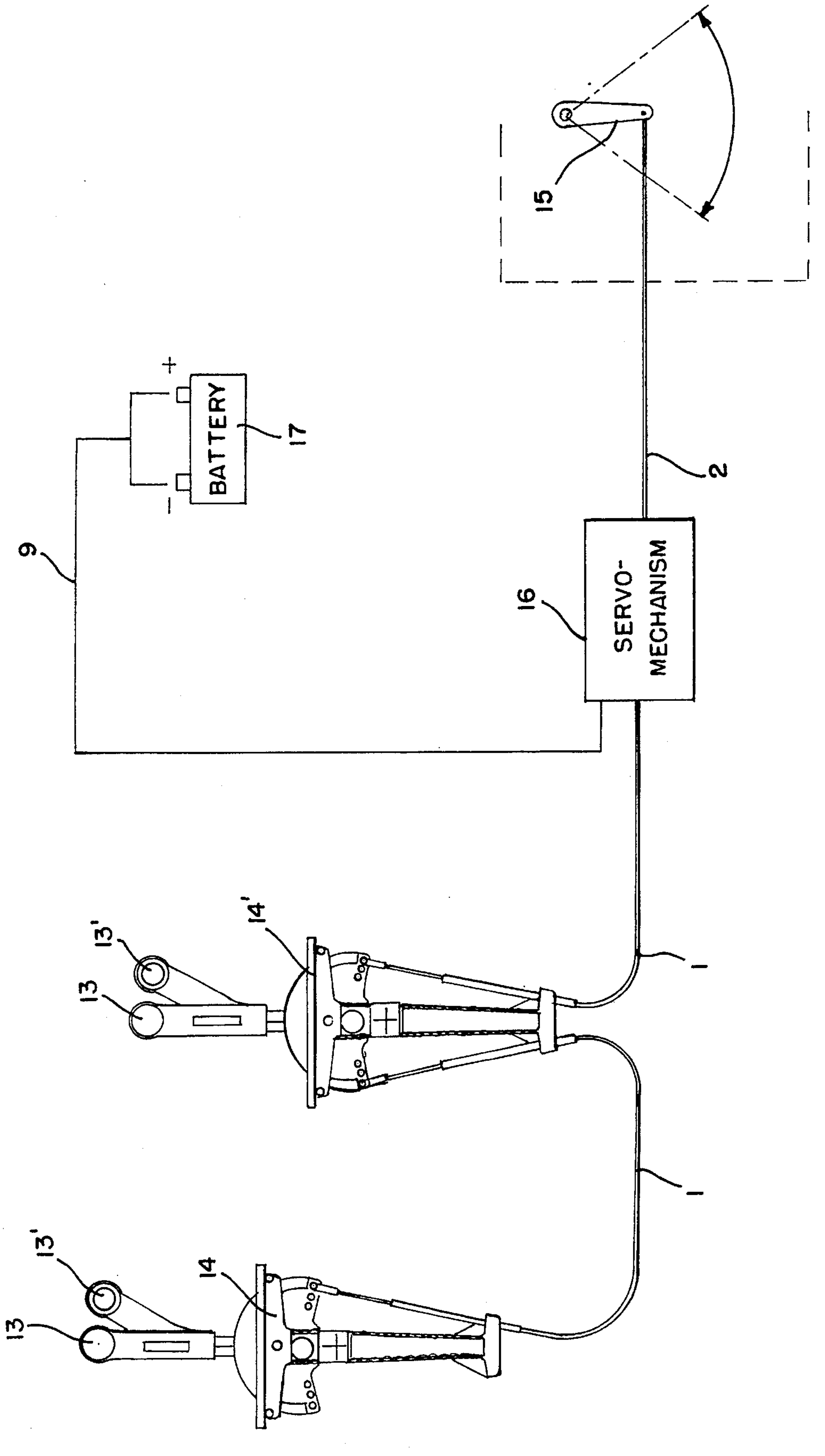
FIG. 5 shows an overall schema of the electromechanical device that is the object of the invention.

In the figures, 1 indicates a first flexible control cable, commonly referred to as a Push-Pull, which is connected to handgrip or pedal 13 of a control assembly 14. On same control assembly 14 there can be several handgrips or pedals such as, e.g., regulating handgrips 13, 13', each of which, by means of a separate remote-control system and a second flexible cable 2, regulates different applications 15, such as an accelerator, a reversing gear of a boat, or other equipment. There can also be multiple control assemblies 14, 14' that are connected in series by control cable 1 as shown in FIG. 5.

The invention features an electromechanical device or a servomechanism 16, which is powered by an electrical power source 17, such as a battery, which transmits the movements of flexible control cable 1 to flexible driven cable 2, and which thus transmits the control movements of handgrip or pedal 13 to application 15.

The servomechanism 16 features two neutral levers 3, 4 with coaxial bodies 3', 4' that are designed with semicylindrical sectors with arcs of slightly less than 180° and, more specifically, with arcs of 180°-2α. From this it follows that opposing edges A, B, C, D of bodies 3', 4' of levers 3, 4 are separated from one another (see FIGS. 1–4).

Control lever 3 is connected to flexible control cable 1, while the other driven lever 4 is connected to the flexible driven cable 2. The two levers 3 and 4 are interconnected and are free to turn, with the aid of known mechanisms.

Bodies 3', 4' of levers 3, 4 consist of a spiral spring 5 that features opposing, outward-facing ends 5', 5" that are arranged between the edges A, B, C, D of the bodies.

The number 6 indicates the drive shaft of a geared motor, which is not shown in the drawings and is of a known design. The drive shaft 6 is tightly clamped by the spring 5 in such a way that strong friction and good attachment are created between the drive shaft 6 and the unstressed spring 5. This spring has two functions: to transmit movement between two levers 3 and 4 and to work as a non-return mechanism, as described below.

According to the invention, a cursor 11 is connected to the sheath of control cable 1, and the cursor, together with the sheath, executes small movements X, Y that are opposite the movement of the control cable 1. To this cursor 11 is connected a transducer 7 which senses these movements X, Y. This transducer can be a position transducer such as a linear or rotary potentiometer, or a pressure transducer.

Transducer 7 is connected to an electronic control unit 8, which is powered via cable 9 from an electrical power source 17, such as a battery.

The electronic control unit 8 controls the geared motor, whose shaft 6 is inserted between spring 5 and bodies 3', 4' of levers 3, 4. In detail, the geared motor is driven in one direction or the other depending on, respectively, displacements X or Y of the cursor and thus, respectively, for each of the two directions of motion of control cable 1 in pull or push. Once the motion of cable 1 ceases, cursor 11 stops, the X=Y condition of the transducer is restored, and at the same time the geared motor stops.

The geared motor generally consists of a d.c. motor and a reduction gear or worm gear, as is commonly known.

Obviously, two levers 3, 4 can be arranged facing one another with cables 1, 2 on the same side, as shown in the drawings, but they can also be placed on the opposing side; in this case, however, cables 1, 2 should be facing one another.

The second driven cable 2 features a fixed clamp 12 for the sheath itself.

Based on the description presented above, its operation is as follows.

When it is necessary to control application 15, control cable 1 is actuated via handgrip or pedal 13, causing control lever 3 to turn. In response to this displacement of cable 1, the corresponding sheath effects a small opposite movement X, Y (X in the case of a pull on cable 1, and Y in the case of a push), thus displacing cursor 11, which causes a change in the position of transducer 7 which, by means of control unit 8, activates the geared motor, causing levers 3, 4 to turn in the desired direction until the initial position X=Y is restored with cable 1 at rest. In this state X=Y, the geared motor stops, and the new position of application 15 is maintained.

Figure 1:
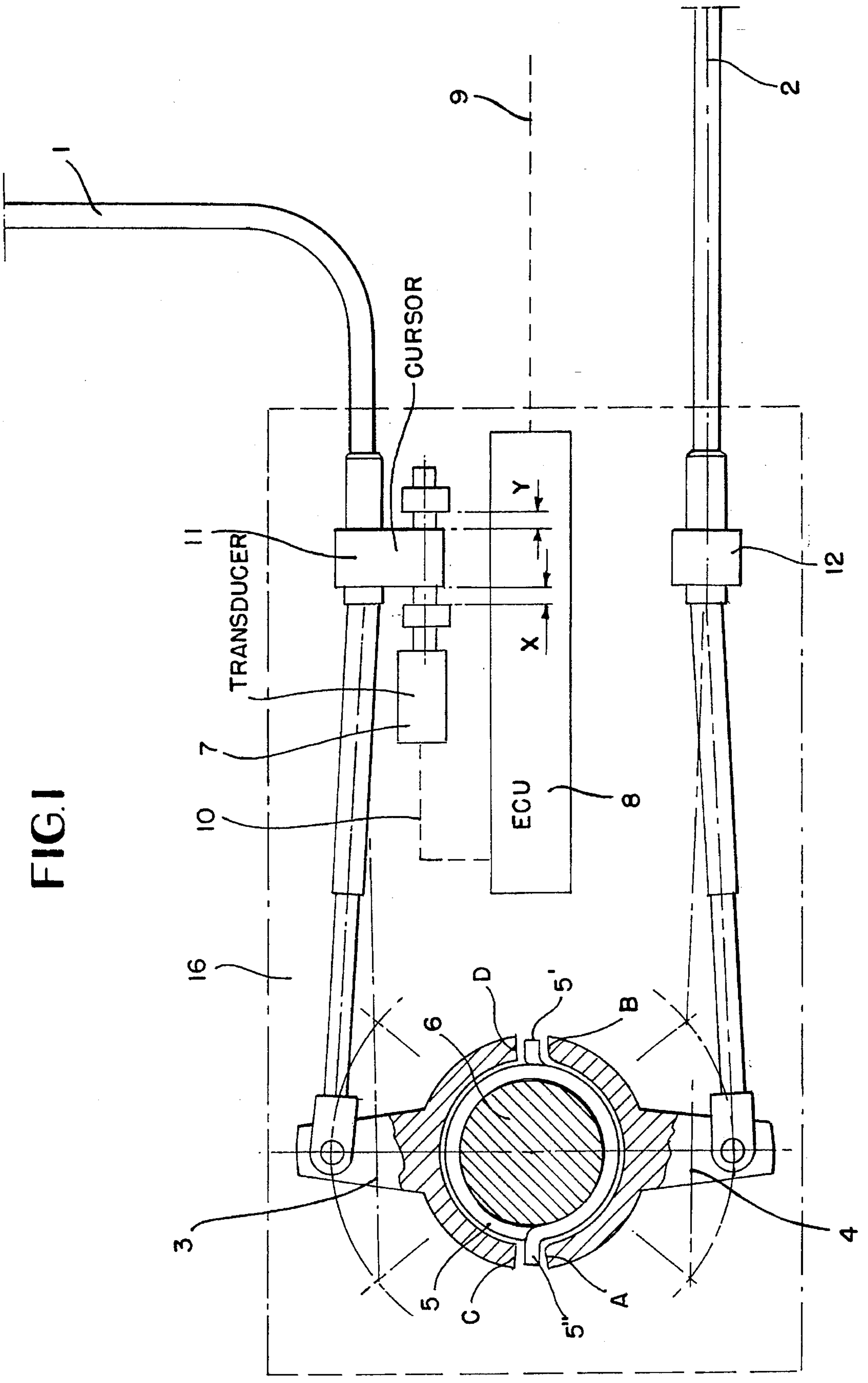
FIG. 1 shows a side view of the device of the present invention.
Figure 3:
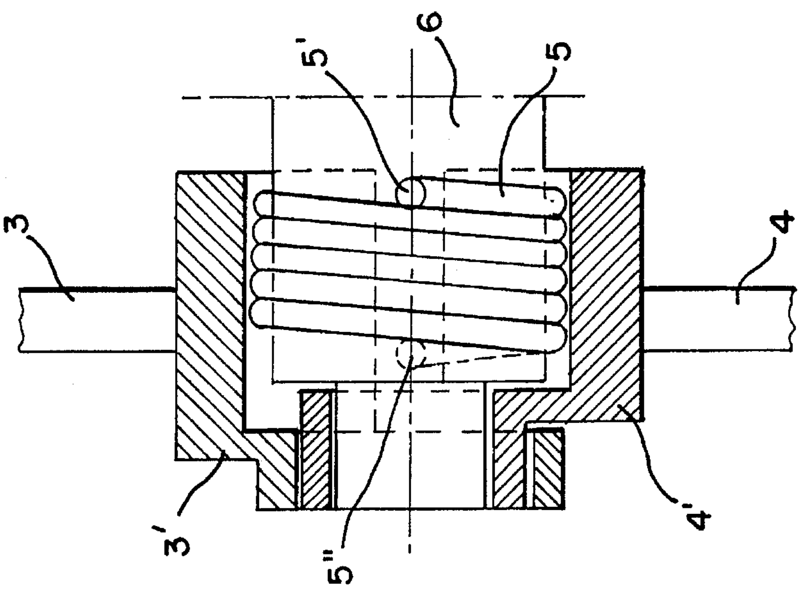
FIG. 3 shows a central longitudinal section along line 3—3 of the device of FIG. 2.
Figure 2:
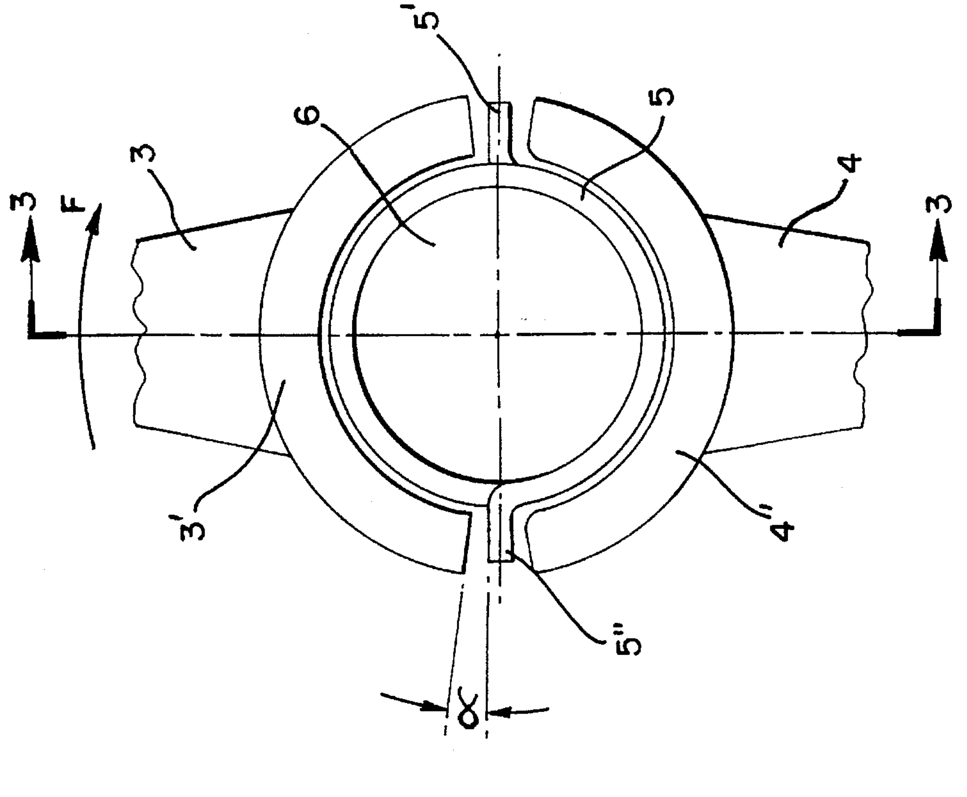
FIG. 2 shows an enlarged view of the lever-type device.
Figure 4:
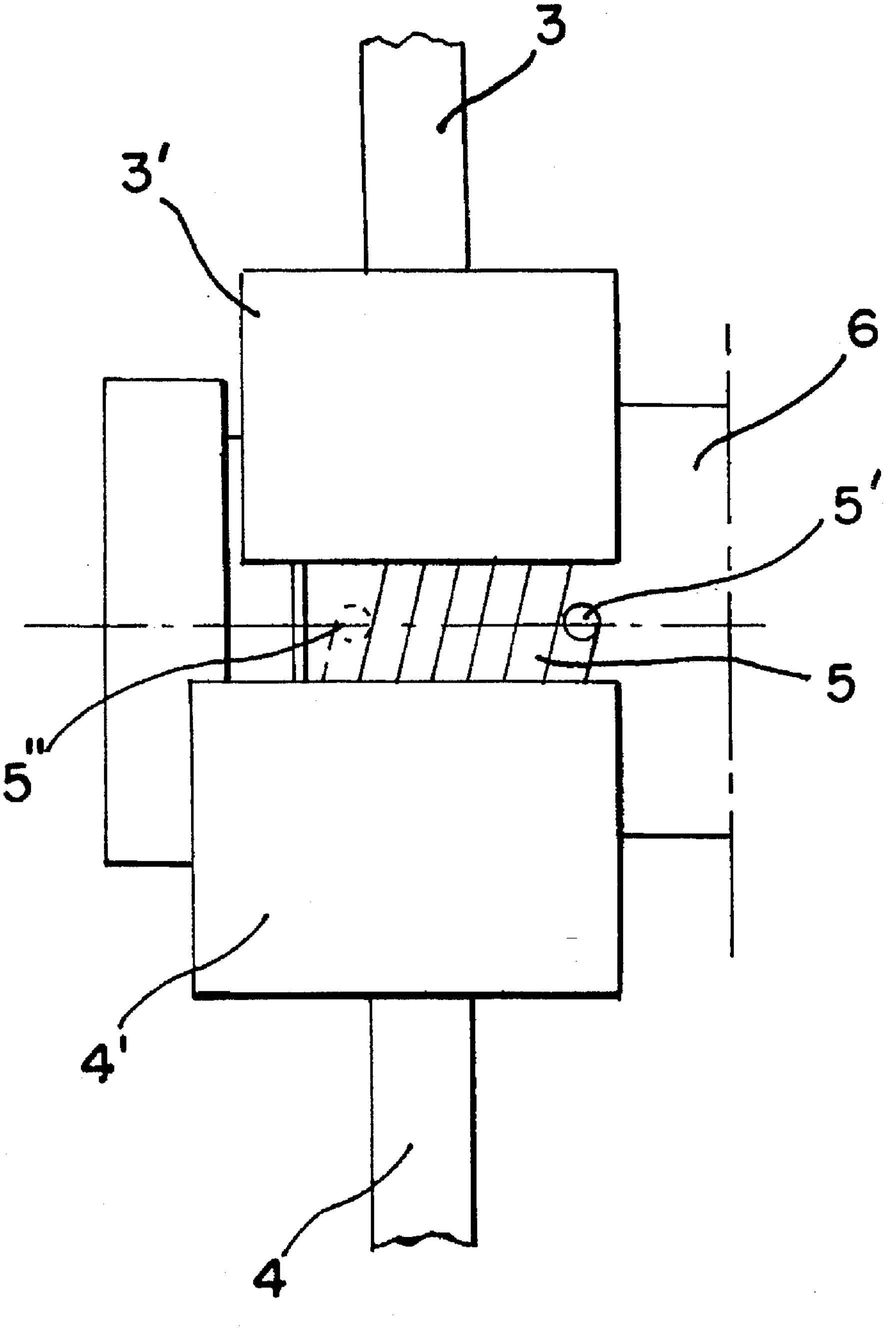
FIG. 4 shows a side view of the device of FIG. 3.

In greater detail, when pulling on control cable 1, control lever 3 tends to turn clockwise as indicated by arrow F in FIG. 2. At the same time, the sheath of control cable 1 effects a slight opposing displacement X, which is detected by cursor 11 and transducer 7, which activate control unit 8, which causes shaft 6 to turn clockwise. Shaft 6 causes spring 5, which is tightly wound on the shaft, to turn; end 5' of said spring pushes on body 4' of driven lever 4, causing it to turn clockwise as well, pulling on driven cable 2 and manipulating application 15.

In the event the power unit malfunctions, control unit 8 will not work, and in this case control will be effected mechanically. By pulling on control cable 1, control lever 3 pushes with its body 3' against end 5' of spring 5 in the direction opposite the above-mentioned winding, and this expands the spring itself, which no longer clamps shaft 6 and can turn freely. This free turning of spring 5 creates, with its end 5', a pushing action on body 4' of driven lever 4, which in turn rotates clockwise, pulling driven cable 2 and actuating application 15. Once the control action on cable 1 ceases, control lever 3 stops turning, meaning that spring 5 is no longer being stressed and returns to its initial state of clamping tightly on shaft 6. Under these conditions any tendency toward returning on the part of application 15 is prevented, and such tendency will tighten the spring on shaft 6; in view of the inert resistance of the geared motor, levers 3 and 4 will remain stopped, thus preventing any undesired return motions. This means that the control effected prior to this will remain in effect until control cable 1 is manipulated again.

Similar behavior is also produced with the counterclockwise movement created by control cable 1 when pushed, which results in a pushing action on driven cable 2 and on application 15.

Of course, the unit for activation of control unit 8 which comprises, by way of example in the preferred embodiment, cursor 11 and transducer 7, both connected to the sheath of control cable 1, can be replaced by any other device that senses the movements of the control cable or tie rod in the two directions of push and pull, and also in the phases of rest.

It follows that the electromechanical device which is the object of this invention makes it possible to effect electromechanical remote control that is precise and easy to manipulate and also makes it possible, in the event that there is a malfunction of the electronic control unit or if there is no power, still to manipulate the application mechanically, while at the same time guaranteeing the non-return of the control being exerted.

According to the invention, it is also possible to reverse the above-described mutual arrangement of the assembly consisting of drive shaft 6—spring 5—bodies 3', 4' of the levers. As a matter of fact, a similar function can be obtained by providing an external hollow shaft 6, inside which is located spring 5 that clamps the inside surface of said shaft and is equipped with ends 5', 5" which face inward and are arranged between bodies 3', 4' of levers 3, 4 located inside the spring; levers 3, 4 are placed outside in order to be connected to cables or tie rods 1, 2.

What is claimed is:

1. An electromechanical remote-control device comprising:

a first flexible control cable arranged in an external sheath and connected to an actuator of a control assembly;

a second driven flexible cable arranged in an external sheath and connected to an application that is to be controlled; and a servomechanism powered by a power source for transmitting movements of said first control cable to said second driven cable and thus from the actuator to the application, wherein said servomechanism includes, two coaxial neutral levers with two corresponding bodies, respectively, each body having a cylindrical sector which covers an arc of a circle that is slightly less than 180° including 180°-2α, where a first one of said levers is attached to said first control cable and a second one of said levers is attached to said second driven cable, a drive shaft arranged coaxially inside the bodies of said levers, a spiral spring arranged between the bodies of said levers and said drive shaft, said spiral spring having outward-facing opposing ends that extend between edges of said bodies, wherein said spring is tightly wound on said drive shaft, a cursor attached to a sheath of said first control cable for effecting movements (X, Y) that are smaller in size and opposite in direction to the movement of said control cable in push or in pull, a transducer connected to said cursor for detecting said movements (X, Y) of said cursor, and an electronic control unit connected to said drive shaft in the two directions of rotation depending on movements (X, Y) of said cursor such that said remote control can be effected electromechanically or, in the event that the electromechanical components malfunction, mechanically, thus guaranteeing that control can be effected at all times.

2. The device according to claim 1, wherein said levers are opposite to one another with straight cables on the same side.

3. The device according to claim 1, wherein said second driven cable includes a fixed clamp of the sheath.

4. The device according to claim 1, wherein there is at least one control assembly arranged in series, said at least one control assembly being connected to said first control cable.

5. The device according to claim 1, wherein at least one of said flexible cables is at least partially formed of tie rods.

6. The device according to claim 1, wherein, in a normal mode, by pulling and pushing said control cable with the aid of the actuator, a displacement (X, Y) occurs with respect to the state of rest (X=Y) of the sheath of said control cable and a corresponding displacement (X=Y) of cursor (11) is performed;

said transducer and activation of said control unit detect said displacement (X, Y);

rotation of said shaft is detected in a selected direction, depending on whether said control cable is pulled or pushed;

the rotation of said drive shaft causes said spring, which is tightly wound on said shaft, to turn; and turning of said spring turns, by means of one of the ends of said spring, said driven lever thereby actuating said driven cable .

7. The device according to claim 1, wherein, in a malfunction mode by pulling and pushing said control cable, said control lever and corresponding body are turned in one direction or the other;

said body pushes on one end of said spring in a direction opposite that in which the spring itself is wound;

said spring expands and loosens a clamping of the spring on said shaft, thereby allowing said spring to turn freely;

one end of said spring pushes on the body;

said driven lever pushes or pulls on said driven cable imparting a corresponding actuation of application; and said spring is retightened on shaft when the action of control cable ceases.

8. The device according to claim 4 or 5, wherein said spring tightly wound on said shaft has an anti-return function, thereby maintaining the application in a position that was initially established by the control.

9. The device according to claim 1, wherein said levers are positioned on one side with straight cables facing them.

* * * * *